US012664147B1

(12) United States Patent　(10) Patent No.:　US 12,664,147 B1
Morle et al.　(45) Date of Patent:　Jun. 23, 2026

(54) ASYNCHRONOUS DATA SET UPDATES FOR ACCESSING DATABASE PARTITIONS

(71) Applicant: Amazon Technologies, Inc., Seattle, WA (US)

(72) Inventors: James Alexander Morle, Dripping Springs, TX (US); Marc Brooker, Seattle, WA (US); Matthys Strydom, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/964,227

(22) Filed: Nov. 29, 2024

(51) Int. Cl.
　*G06F 17/00*　(2019.01)
　*G06F 16/23*　(2019.01)
　*G06F 16/28*　(2019.01)
(52) U.S. Cl.
　CPC ........ *G06F 16/2358* (2019.01); *G06F 16/284* (2019.01)
(58) Field of Classification Search
　CPC ........ G06F 16/13; G06F 16/24; G06F 16/156; G06F 3/1297; G06N 3/00; G06N 5/00; G05B 13/00; H03M 7/30; H04N 9/8042; G06T 9/00
　See application file for complete search history.

(56)　References Cited

U.S. PATENT DOCUMENTS

| | | | |
|---|---|---|---|
| 10,503,699 B2 | 12/2019 | Gupta et al. | |
| 10,585,873 B2 | 3/2020 | Lee et al. | |
| 11,314,714 B2 | 4/2022 | Rice et al. | |
| 11,314,717 B1 * | 4/2022 | Certain | G06F 16/2308 |
| 11,573,947 B2 * | 2/2023 | Lee | G06F 16/2329 |
| 11,586,608 B1 * | 2/2023 | Kansal | G06F 16/2455 |
| 11,789,971 B1 * | 10/2023 | Kuppahally | G06F 16/2365 |
| | | | 707/634 |
| 12,248,403 B1 * | 3/2025 | Vemuri | G06F 12/0893 |
| 2022/0164366 A1 * | 5/2022 | Kuppahally | G06F 16/27 |
| 2023/0401323 A1 * | 12/2023 | Vaks | G06F 3/0655 |
| 2024/0394273 A1 * | 11/2024 | Fang | G06F 16/254 |

* cited by examiner

*Primary Examiner* — Hung D Le
(74) *Attorney, Agent, or Firm* — S. Scott Foster; Kowert, Hood, Munyon, Rankin & Goetzel, P.C.

(57)　ABSTRACT

An update to a data set is received at a distributed database system. The data set is stored with or cached for accessing different partitions of a database. A new version identifier of the data set is written to indicate the update to the data set using a corresponding log record written to respective update logs of the different partitions of the database. The new version identifier is then used as part of subsequent validation operations for access requests to the database.

18 Claims, 11 Drawing Sheets

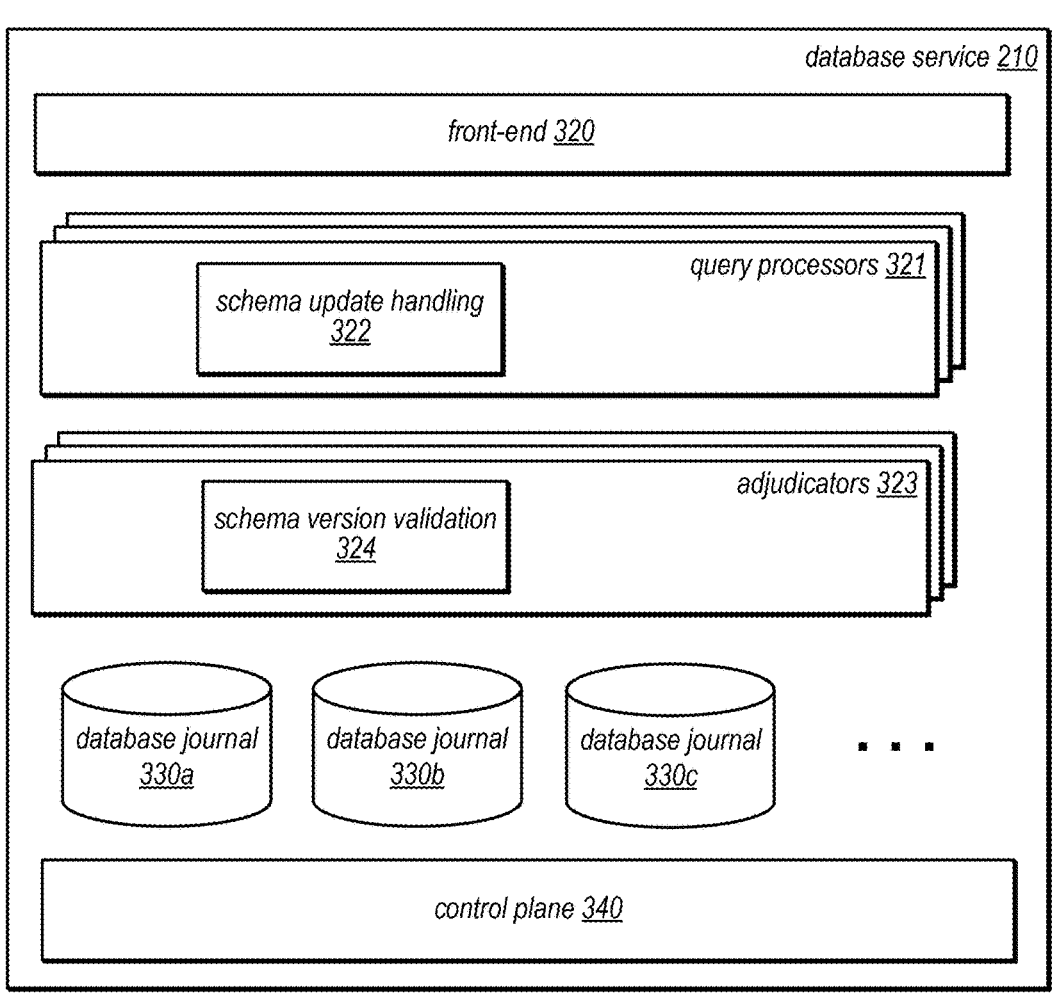
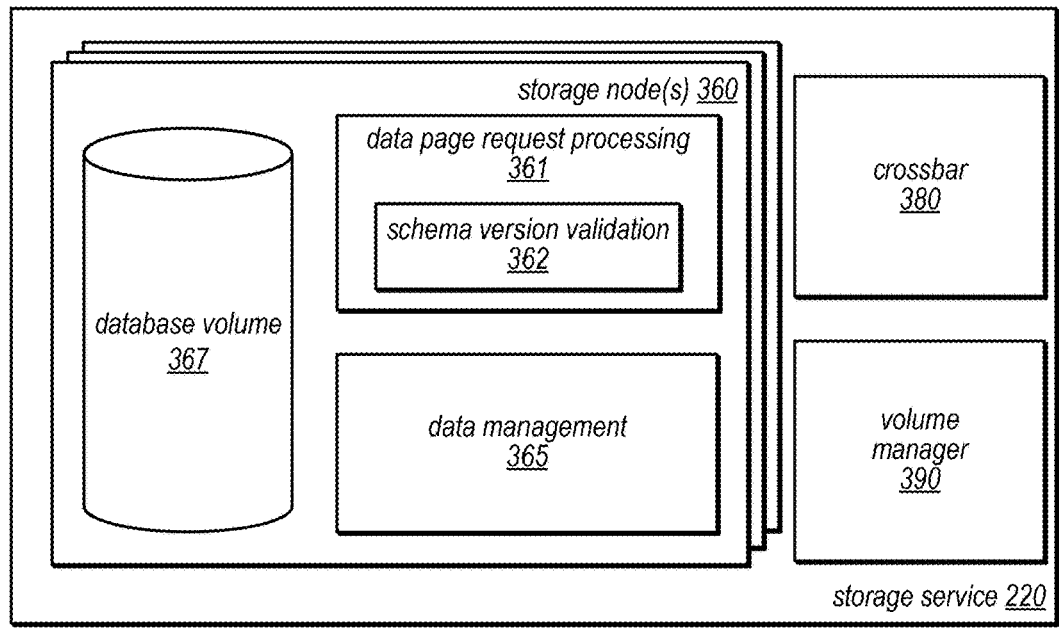
FIG. 3

Schema State
Changes
690

| Time | 0 | 1 | 2 | 3 | 4 | 5 | 6 | 7 | 8 |
|---|---|---|---|---|---|---|---|---|---|
| State | Start | Start | Start | Start | Start | Building | Building | Final | Final |
| Active Schema | $A_0$ | $A_0$ | $A_0$ | $A_0$ | $A_0$ | $A_0$ | $A_0$ | $B_5$ | $B_5$ |
| Schema Update | | | | | $B_5$ | $B_5$ | $B_5$ | | |
| Reader | $A_0$ | $A_0$ | $A_0$ | $A_0$ | $A_0$ | $A_0$ | $A_0$ | $B_5$ | $B_5$ |
| Writer | $A_0$ | $A_0$ | $A_0$ | $A_0$ | $A_0$ and $B_5$ | $A_0$ and $B_5$ | $B_5$ | $B_5$ | |

*FIG. 6B*

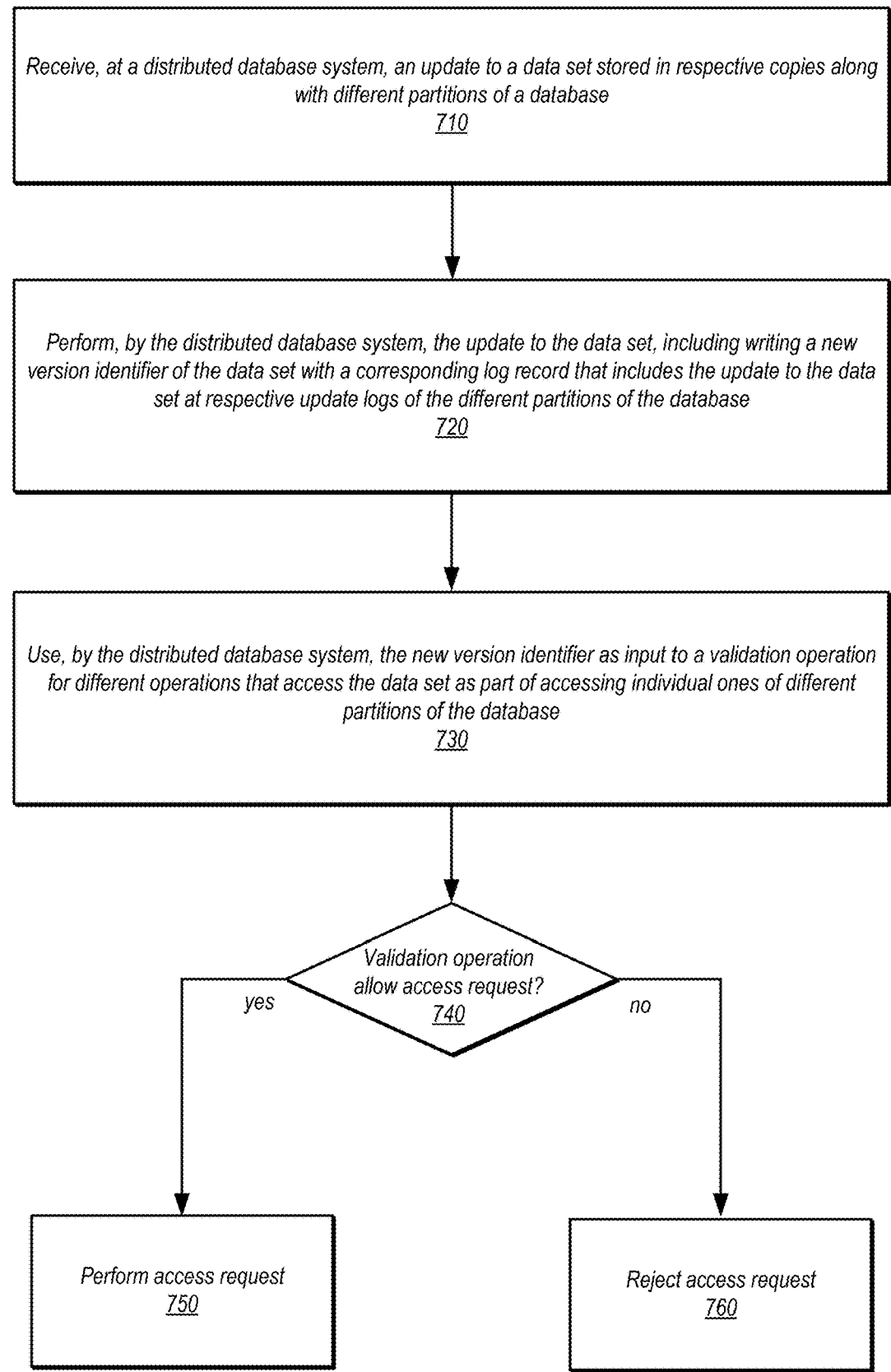

Receive, at a distributed database system, an update to a data set stored in respective copies along with different partitions of a database
710

Perform, by the distributed database system, the update to the data set, including writing a new version identifier of the data set with a corresponding log record that includes the update to the data set at respective update logs of the different partitions of the database
720

Use, by the distributed database system, the new version identifier as input to a validation operation for different operations that access the data set as part of accessing individual ones of different partitions of the database
730

Validation operation allow access request?
740 yes          no

Perform access request
750

Reject access request
760

FIG. 7

ASYNCHRONOUS DATA SET UPDATES FOR ACCESSING DATABASE PARTITIONS

BACKGROUND

Commoditization of computer hardware and software components has led to the rise of service providers that provide computational and storage capacity as a service. At least some of these services, such as database services, are implemented in distributed fashion in order to provide durability and availability of data. In this way, workloads for client applications can be distributed amongst multiple components of a distributed database system in order to provide consistent performance.

BRIEF DESCRIPTION OF THE DRAWINGS

FIG. 3 is a block diagram illustrating various components of a database service and storage service that host databases accessible to database clients, according to some embodiments.

FIG. 6B is an example of state transitions for catalog updates that change a schema, according to some embodiments.

FIG. 7 is a high-level flowchart illustrating various methods and techniques to implement asynchronous data set updates for accessing database partitions, according to some embodiments.

Figure 1A:
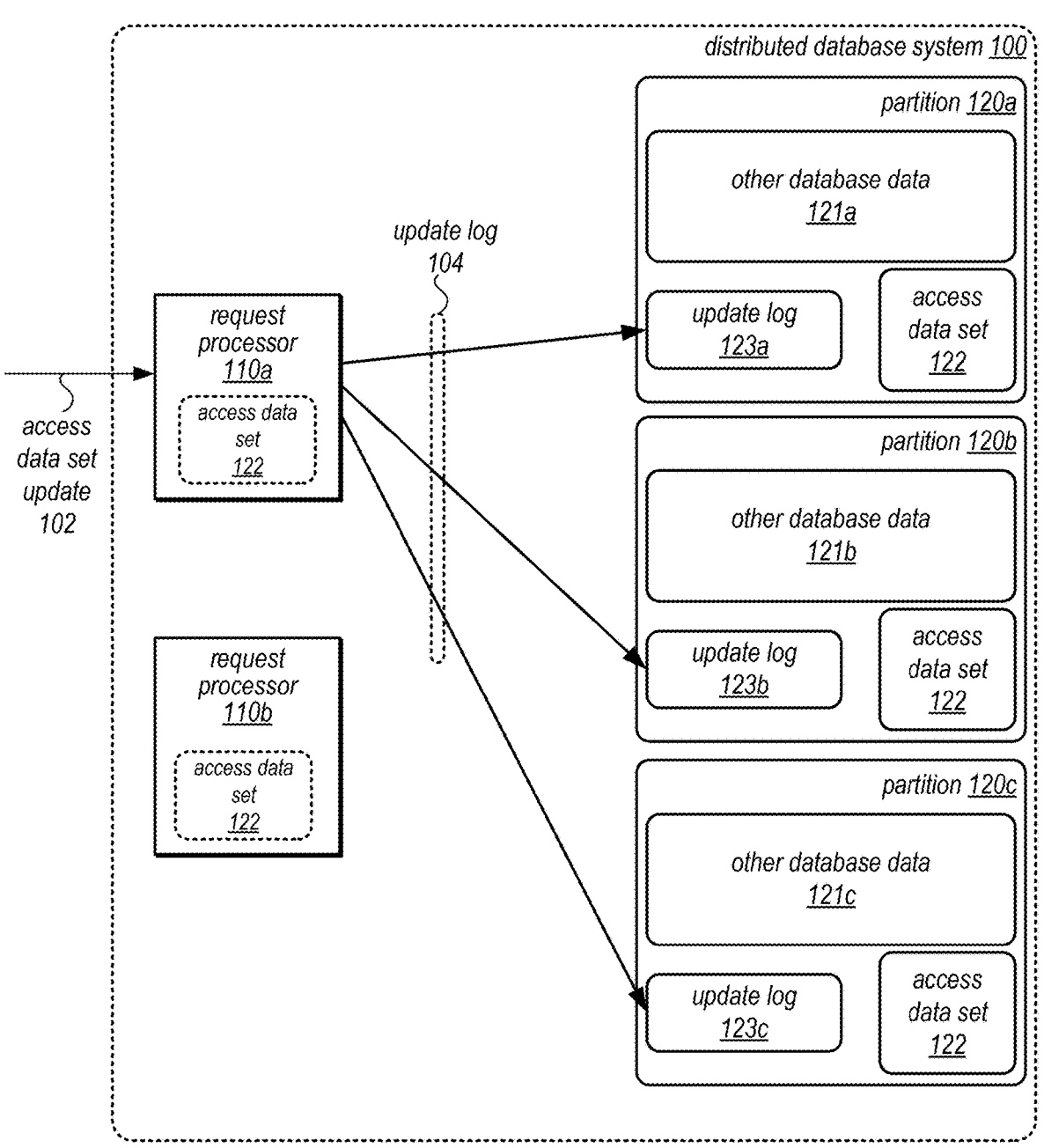
FIGS. 1A and 1B are logical block diagrams illustrating asynchronous data set updates for accessing database partitions, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Database systems support different types of requests to reconfigure or optimize performance of a database. For example, Data Definition Language (DDL) requests may be performed which alter a table to add columns, modify table schema, or otherwise change the data that has to be stored. Similarly, some types of requests to add new data structures (e.g., secondary indexes), drop or delete data, or various other requests may cause tasks that are performed asynchronously (e.g., where the task is performed over a long period of time and/or does not have a client application that is waiting on a response to return). In order to perform these tasks as well as updates to other data sets used to access database data without interfering with other tasks (e.g., synchronous tasks, such as queries or transactions), database systems may implement asynchronous data set updates for accessing database partitions. As one of ordinary skill in the art may appreciate, improving the performance of asynchronous updates to ensure that correct versions of data that may be cached or stored across multiple partitions (and/or request processors) without interfering with synchronous tasks, will improve the performance of database systems, client applications that rely upon database systems and computer-related technologies more generally. Moreover, techniques that implement asynchronous data set updates for accessing database partitions can provide consistent performance (e.g., allowing applications or other reliant systems on the results of these tasks (including database systems) to use consistent and correct data returned when performing other access requests (e.g., synchronous tasks).

Figure 1B:
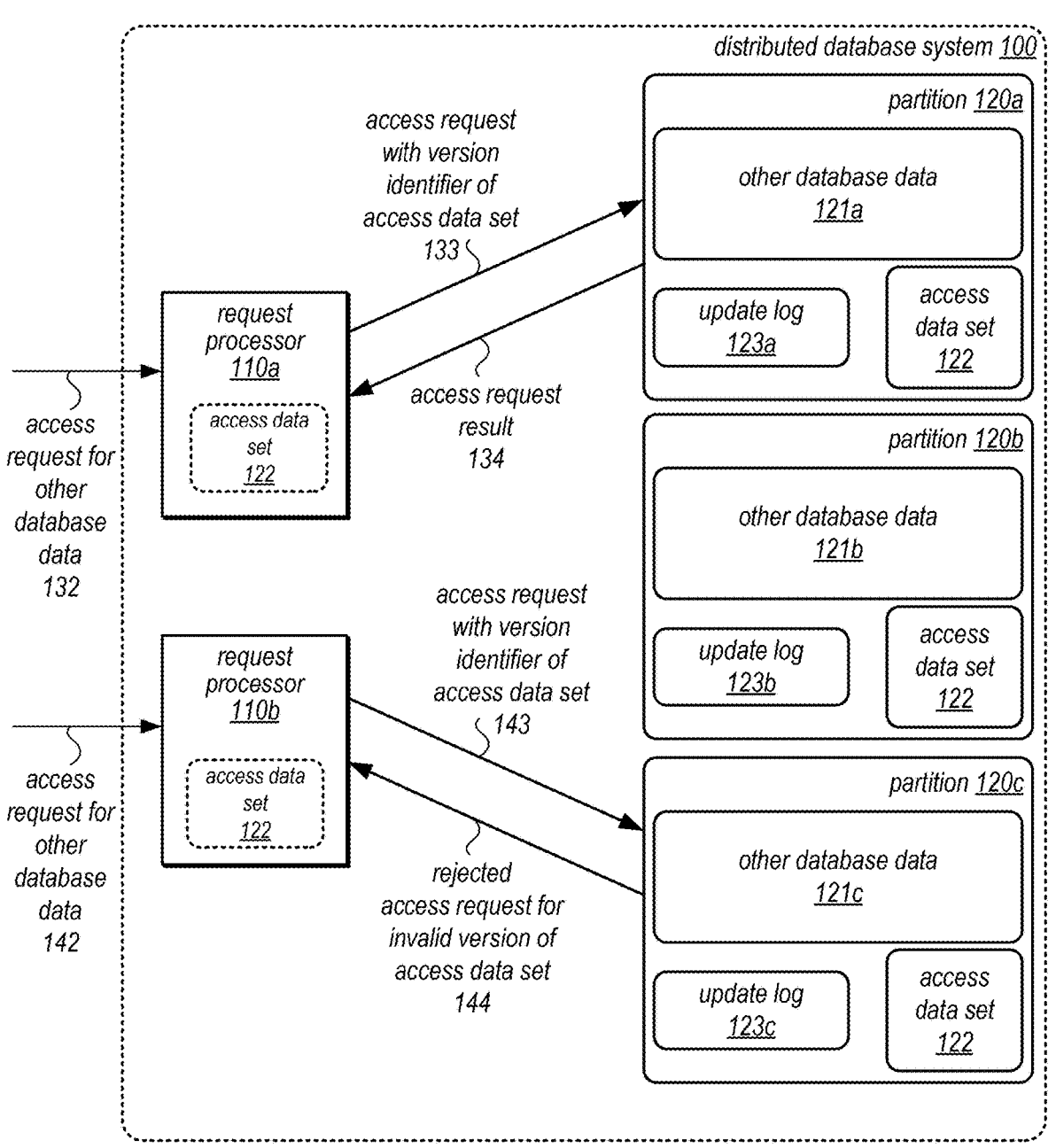

FIGS. 1A and 1B are logical block diagrams illustrating asynchronous data set updates for accessing database partitions, according to some embodiments. In FIG. 1A, a distributed database system 100 may be a stand-alone database system (e.g., implemented on private network systems or services or implemented by a user of a cloud or other provider network, like the provider network discussed in detail below with regard to FIG. 2). In some embodiments, distributed database system 100 may be database service, like database service 210 discussed in detail below with regard to FIGS. 2-7, which may be implemented and managed by a provider network. Distributed database system 100 may be one of many different types of database, including types that support different kinds of access to database data, such as through the use of a query language like Structured Query Language (SQL) or APIs or other commands that provide access. Different types of databases may store data for the database in different formats and according to different data models. For instance, one type of database may use a relational data model that imposes a common schema for a table of the relational database and another type of database may use a non-relational data model that imposes a flexible schema, which may not be common across different items or objects in the database. Databases may store various types of data including, but not limited to, graph databases storing data using a graph data model, time series databases storing time series data, key-value database that use a unique key-value to lookup data objects of various data types or formats in the database, or document databases that store data as a document with varying attributes, including nested data. Distributed database system 100 may store database data in a storage system as different portions, shards, or other partitions of database tables. In at least one embodiment, the database may be stored in a distributed data storage system, such as storage service 220 discussed below with regard to FIGS. 2-5, where each partition may be stored in a separate location (e.g., a separate network location) of a distributed storage system (e.g., on different storage nodes or servers).

As illustrated in FIG. 1A, distributed database system may include a number request processors, such as request processors 110a and 110b, which perform access requests to other database data, 121a, 121b, and 121c, across multiple partition(s) 120A, 120b, and 120c. In at least one embodiment, request processors 110 may implement query engines or other request parsing, planning, and execution components to perform access request to data sets. In at least one embodiment, request processors 110 may be similar to query processors 321 in FIG. 3. In at least one embodiment, different partitions may be stored or replicated across different storage locations (e.g., different servers or storage nodes, different rooms of data centers, different data centers or, as discussed below with regard to FIG. 2, different regions (also discussed below with regard to FIG. 5).

Access data set update request 102 may be received at request processor 110a. Request processor 110a may perform the access data set update request (e.g., by determining changes to make to other database data 121 if necessary) by updating access data set 122 via a write 104 to respective update logs 123a, 123b, and 123c. In at least one embodiment, update logs 123 may store writes or other updates to a database in order (e.g., according to time or correct order of performance such that log records do not need to be reordered at a later time). As illustrated in FIG. 1A, these updates may be performed directly (e.g., by performing writes that are used to create log records that are stored at a storage system or by sending the writes as log records to be stored), or indirectly through the use of a separate commitment component, such as adjudicators as illustrated below with regard to FIGS. 3-6A. In at least one embodiment, a limit on a number of access data set 122 update requests that are allowed may be enforced (e.g., one at a time).

In at least one embodiment, request processors 110a and 110b may maintain cached copies of access data set 122. For example, access data set 122 may be metadata of a catalog (e.g., version information and other information that is used to access a database according to a schema as described in a catalog), where the catalog describes a schema(s) of table(s) of a database. In at least one embodiment, access data set 122 may be frequently accessed data (e.g., a frequently accessed table that is used to determine which other tables to join or read to complete an access request).

As illustrated in FIG. 1B, access requests may make use of access data set 122 to perform. Validation operations, as discussed below with regard to FIGS. 4, 7 and 8, may be used to determine whether an access is relying upon a correct version of access data set 122 and can proceed (or not). For example, access request for other database data 132 may be received at request processor 110a, which may have a current version of access data set 122 (or reference it using a version identifier) so that it can correctly access 133 partitions, such as partition 120a, which may return access request result. If, for example, an access request, like access request 142 is received, that does not have a valid version identifier, then that access request with the version identifier 143 maybe rejected, as indicated at 144.

Please note, FIG. 1 is provided as a logical illustration of a database system and its respective components, as well as respective interactions and is not intended to be limiting as to the physical arrangement, size, or number of components or devices to implement such features. Additional multiple components may be involved, distributing the responsibilities of a database system 100 across multiple components (e.g., a query processor, adjudicator, and so on as illustrated below with regard to FIGS. 3-5).

The specification continues with an example network-based database service implemented as part of a provider network that performs asynchronous data set updates for accessing database partitions. Included in the description of the example database service are various aspects of the example database service, such as a database instance, and a separate storage service. The specification then describes flowcharts of various embodiments of methods asynchronous data set updates for accessing database partitions. Next, the specification describes an example system that may implement the disclosed techniques. Various examples are provided throughout the specification.

Figure 2:
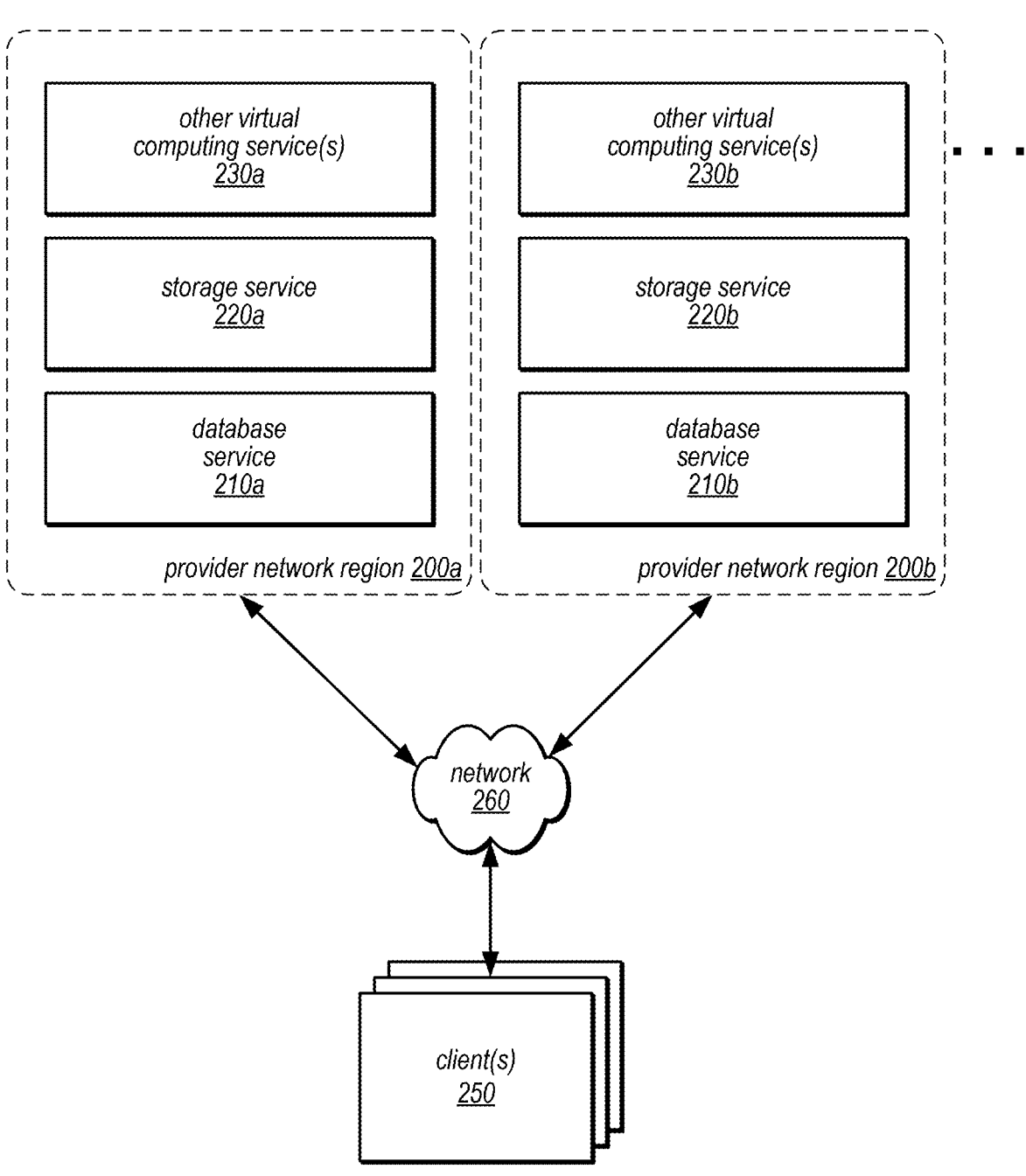
FIG. 2 is a block diagram illustrating provider network regions that may implement a database service that implement technique for asynchronous data set updates for accessing database partitions, according to some embodiments.

FIG. 2 is a block diagram illustrating provider network regions that may implement a database service that implement technique for asynchronous data set updates for accessing database partitions, according to some embodiments. A provider network (sometimes referred to as a "cloud provider network" or "cloud") refers to a pool of network-accessible computing resources (such as compute, storage, and networking resources, applications, and services), which may be virtualized or bare-metal. The provider network can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users can connect to availability zones of the provider network via a publicly accessible network (e.g., the Internet, a cellular communication network) by way of a transit center (TC). TCs can be considered as the primary backbone locations linking users to the provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The provider network may deliver content from points of presence outside of, but networked with, these regions by way of edge locations and regional edge cache servers (points of presence, or PoPs). This compartmentalization and geographic distribution of computing hardware enables the provider network to provide low-latency resource access to users on a global scale with a high degree of fault tolerance and stability.

The provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the provider network, which may be provisioned in user accounts.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

As depicted in FIG. 2, an exemplary provider network may include numerous provider network regions 220a, 220b, and so on that may include one or more data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network within the provider network regions 200.

In the illustrated embodiment, a number of clients (shown as clients 250 may interact with a provider network 200 via a network 260. Provider network may implement respective instantiations of the same (or different) services, a database service 210a for region 200a and database service 210b for region 200b, a storage service 220a for region 200a and storage service 220b for region 220b, as well as various other virtual computing services 230a and 230b respectively. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to one or more of provider network regions 200a or 200b via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with service of a region of a provider network. In some embodiments, client 250 may generate network-based services requests according to a Representational State Transfer (REST)-style web services architecture, a document- or message-based network-based services architecture, or another suitable network-based services architecture. Although not illustrated, some clients of provider network 200 services may be implemented within a service of the provider network (e.g., a client application of database service 210*a* may be implemented on one of other virtual computing service(s) 230*a* in region 200*a*), in some embodiments. Therefore, various examples of the interactions discussed with regard to clients 250 may be implemented for internal clients as well, in some embodiments.

In some embodiments, a client 250 (e.g., a database service client) may be may provide access to network-based storage of database data to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to the provider network may be coordinated by client 250 and the operating system or file system on behalf of applications executing within the operating system environment.

Clients 250 may convey network-based services requests to and receive responses from a region of the provider network via network 260. In various embodiments, network 260 may encompass any suitable combination of networking hardware and protocols necessary to establish network-based communications between clients 250 and provider network regions 200*a* and 200*b*. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and the provider network region may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network regions 200*a* and 200*b*. It is noted that in some embodiments, clients 250 may communicate with regions of a provider network using a private network rather than the public Internet. For example, clients 250 may be provisioned within the same enterprise as a database service. In such a case, clients 250 may communicate with a provider network region entirely through a private network 260 (e.g., a LAN or WAN that may use Internet-based communication protocols but which is not publicly accessible).

Generally speaking, provider network regions 200*a* and 200*b* may implement one or more service endpoints may receive and process network-based services requests, such as requests to access a database (e.g., queries, inserts, updates, etc.) and/or manage a database (e.g., create a database, configure a database, etc.). For example, a provider network region may include hardware and/or software may implement a particular endpoint, such that an HTTP-based network-based services request directed to that endpoint is properly received and processed. In one embodiment, a provider network region may be implemented as a server system may receive network-based services requests from clients 250 and to forward them to components of a system that implements database service 210*a* or 210*b*, storage service 220*a* or 220*b* and/or another virtual computing service 230*a* or 230*b* for processing. In other embodiments, provider network region may be configured as a number of distinct systems (e.g., in a cluster topology) implementing load balancing and other request management features may dynamically manage large-scale network-based services request processing loads. In various embodiments, a provider network region may be may support REST-style or document-based (e.g., SOAP-based) types of network-based services requests.

In addition to functioning as an addressable endpoint for clients' network-based services requests, in some embodiments, a provider network region may implement various client management features. For example, provider network region 200*a* may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network regions may also implement financial accounting and billing systems, or may maintain a database of usage data that may be queried and processed by external systems for reporting and billing of client usage activity. In certain embodiments, provider network regions may collect, monitor and/or aggregate a variety of storage service system operational metrics, such as metrics reflecting the rates and types of requests received from clients 250, bandwidth utilized by such requests, system processing latency for such requests, system component utilization, such as the target capacity determined for individual database engine head node instances, network bandwidth and/or storage utilization, rates and types of errors resulting from requests, characteristics of stored and databases (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210*a* or 210*b*, storage service 220*a* or 220*b* and/or another virtual computing service 230*a* or 230*b* (or the underlying systems that implement those services).

In some embodiments, provider network regions may also implement user authentication and access control procedures. For example, for a given network-based services request to access a particular database table, a provider network region ascertain whether the client 250 associated with the request is authorized to access the particular database table. Provider network regions may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, the provider network region may reject the corresponding network-based services request, for example by returning a response to the requesting client 250 indicating an error condition. Various access control policies may be stored as records or lists of access control information by database services 210a or 210b, storage services 220a or 220b and/or other virtual computing services 230a or 230b.

Note that in many of the examples described herein, services, like database service or storage service may be internal to a computing system or an enterprise system that provides database services to clients 250, and may not be exposed to external clients (e.g., users or client applications). In such embodiments, the internal "client" (e.g., database service 210a) may access storage service 220a over a local or private network (e.g., through an API directly between the systems that implement these services). In such embodiments, the use of storage service 220a in storing database tables on behalf of clients 250 may be transparent to those clients. In other embodiments, storage services 220a or 220b may be exposed to clients 250 through provider network region 200a or 200b to provide storage of database tables or other information for applications other than those that rely on database service 210a or 210b for database management. In such embodiments, clients of the storage service 220a or 220b may access storage service 220a or 220b via network 260 (e.g., over the Internet). In some embodiments, a virtual computing service 230a or 230b may receive or use data from storage service 220a or 220b (e.g., through an API directly between the virtual computing service 230a or 230b and storage service 220a or 220b) to store objects used in performing computing services 230a or 230b on behalf of a client 250. In some cases, the accounting and/or credentialing services of provider network region may be unnecessary for internal clients such as administrative clients or between service components within the same enterprise.

FIG. 3 is a block diagram illustrating various components of a database service and storage service that host databases accessible to database clients, according to some embodiments. Database service 210 (instantiated as database service 210a in region 200a and 210b in region 200b) may implement control plane 340 which may manage the creation, provisioning, deletion, or other features of managing a database hosted in database service 210. For example, control plane 340 may monitor the performance of host(s) 310 (e.g., a computing system or device like computing system 1000 discussed below with regard to FIG. 9) for high workloads (e.g., heat) and move or redirect placement of database engine head node instances away from some hosts to avoid overburdening host(s) 310. Control plane 340 may handle various management requests, such as request to create databases, manage databases (e.g., by configuring or modifying performance, such as by enabling a "serverless" or other automated management feature in response to a request which may cause resource scaling to be enabled for that database. Control plane 340 may direct placement of database engine head node instances on host(s) so as to distribute workload across host(s) to avoid failure scenarios, like out-of-memory.

Database service 210 may implement one or more different types of database systems with respective types of query processors for accessing database data as part of the database. For example, database service 210 may implement various types of connection-based (e.g., having established a network connection between a database client and database instance 320) database systems which may, for instance, facilitate the performance of various operations that continue over multiple communications between the database client and the connected database instance 320. In at least some embodiments, database service 210 may be a relational database service that hosts relational databases on behalf of clients.

Database service 210 may implement a fleet of host(s) 310 which may provide, in various embodiments, a multi-tenant configuration so that different database instances, such as database instance 320a and 320b, can be hosted on the same host 310, but provide access to different databases on behalf of different clients over different connections. In some embodiment hosts(s) 310 may not be multi-tenant.

In various embodiments, host(s) may implement a virtualization technology, such as virtual machine based virtualization or container-based virtualization, wherein database instances 320 may be different respective virtual machines, micro virtual machines (microVMs) which may offer a reduced or light-weight virtual machine implementation that retains use of individual kernels within a microVM, or containers which offer virtualization of an operating system using a shared kernel. Host(s) may implement a virtualization manager, which may support hosting one or multiple separate query processors 321 as different respective VMs, microVMs, or containers. Virtualization manager may support increasing or decreasing resources made available to host(s) to use for other tasks. In at least one embodiment, query processors 321 may implement schema update handling 322, which may include generating catalog version identifiers to be submitted as part of a request to update a catalog for a schema update (e.g., for a DDL command). For example, a current catalog version identifier may be incremented. In another example, a timestamp (e.g., determined using a global time synchronization service that supports synchronized time across large distances, such as across provider network regions).

Host systems may support various features for accessing a database, such as query processor(s) 321, and adjudicator(s) 323 discussed in detail below with regard to FIGS. 4-5. Query processors 321 may implement agents, interfaces, or other controls according to the respective type of virtualization used to collect and facilitate communication of utilization metrics for in-place scaling, among other supported aspects of virtualization. In at least some embodiments, query processors 321 may implement synchronous task query processors and asynchronous task query processors, which may separately execute queries and other tasks to perform synchronous and asynchronous tasks.

In some embodiments, database data for a database of database service 210 may be stored in a separate storage service 220. In some embodiments, storage service 220 may be implemented as to store database data as virtual disk or other persistent storage drives. In other embodiments, embodiments, storage service 220 may store data for databases using log-structured storage. Storage service 220 may implement control or management features, such as volume manager 390, which may control various management tasks or operations for storage node(s) 360 and/or database volumes 367 (e.g., mounting new volumes, instigating backup, etc.). Crossbars 380, as discussed in detail below with regard to FIGS. 4 and 5, may be applied to apply journal records from database journals 330 in order to update database volumes 367. Crossbars 180 may include index record handling, which may identify records that have special handling as records of secondary index builds that are unique.

For example, data may be organized in various logical volumes, segments, and pages for storage on one or more storage nodes 360 of storage service 220. For example, in some embodiments, each database may be represented by a logical volume, and each logical volume may be segmented over a collection of storage nodes 360. Each segment, which may live on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

In some embodiments, storage nodes 360 of storage service 220 may perform some database system responsibilities, such as the updating of data pages for a database, and in some instances perform some query processing on data. As illustrated in FIG. 3, storage node(s) 360 may implement data page request processing 361, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), clone volume creation, log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages to be returned responsive to a request. In at least one embodiment, data page request handling 361 may implement schema version validation 362, which may validate schema versions for read requests, as discussed below with regard to FIGS. 4, 7, and 8.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

In some embodiments, respective database journals, such as database journals 330a through 330d, may be hosted in database service that stores ordered updates to the database (e.g., to a database volume). In at least one embodiment, database journals 330 may be logs that include updates described or stored in log records (e.g., individually or as multiple updates per log record). Adjudicators 323 may responsible for deciding whether transactions or writes can be committed (while following isolation rules), for working with database journal(s) 330a through 330d to order transactions, and for ensuring that committed data is strongly consistent. In at least some embodiments, adjudicators 323 may implement schema version validation 324, which may validate schema versions for write requests, as discussed below with regard to FIGS. 4, 7, and 8.

Front-end 320 may implement a proxy, request router or other load balancing feature that routes database requests to one or more query processors 321. For example, front-end 320 may be responsible for authenticating requests to connect to a database at a particular network endpoint and allocating a query processor 321 to the connection (or to a particular request such as a query or transaction). The front-end 320 may maintain the connection (e.g., as a proxy) so that if different query processors are used for different requests to the database, separate connections do not have to be established.

Figure 4:
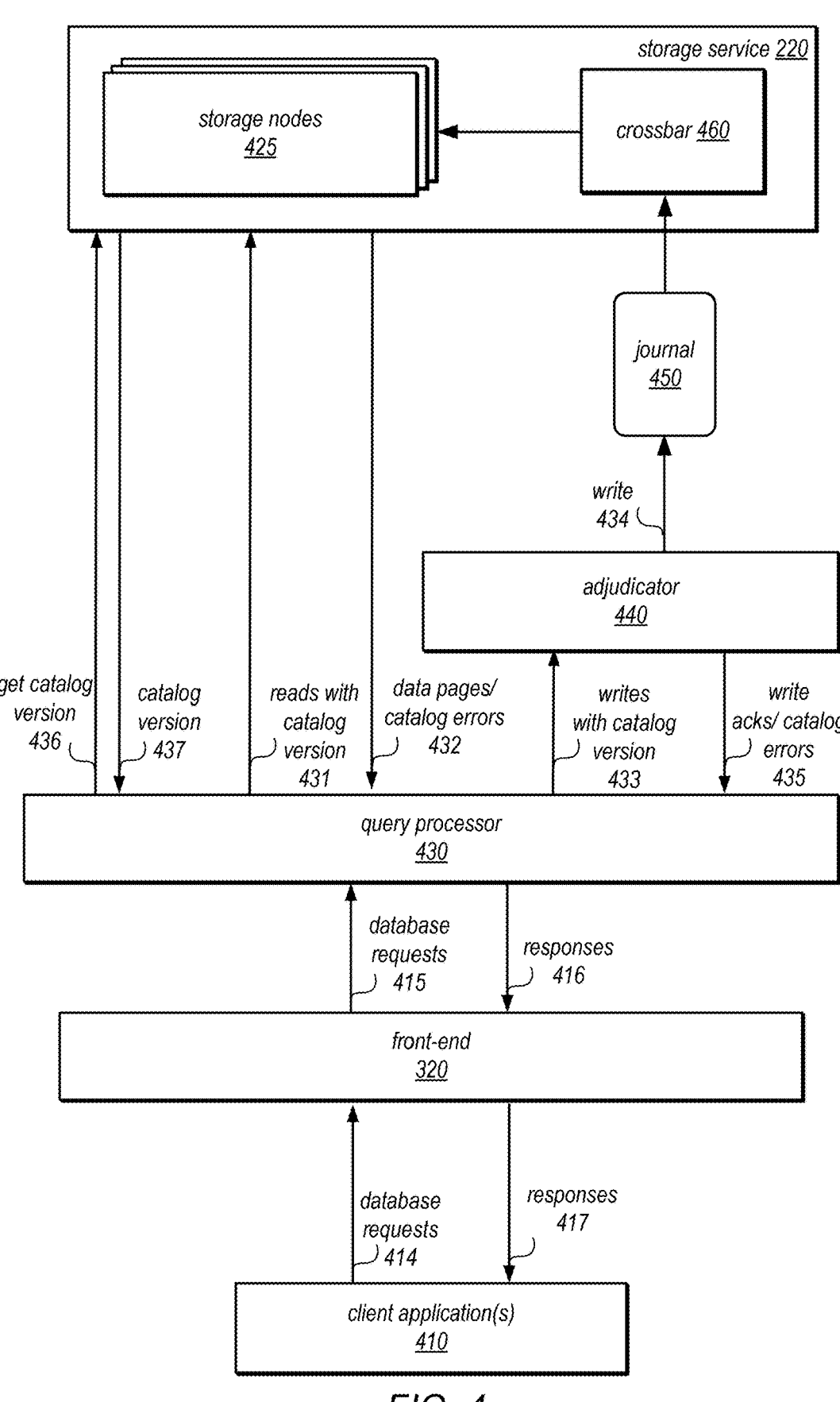
FIG. 4 is a block diagram illustrating the interactions between a database service and separate storage service, according to some embodiments.

FIG. 4 is a block diagram illustrating various interactions to handle database client requests, according to some embodiments. In this example, one or more client application(s) 410 may store data to one or more databases maintained by a database service 210. Client application(s) 410 may submit database requests 414 (e.g., requests that cause reads, such as queries or read-only transactions, or requests that cause writes, such as updates, inserts, deletions, or transactions that include write statements) and receive responses 417 from front-end 320.

Front-end 320 may dispatch database requests 415 to a query processor 430, which may parse the request and interact with different components according to the type of request. For read request, query processor 430 may rely upon a local cache and/or access storage nodes 425 by submitting read requests 431 for data pages, including an assumed catalog version at query processor 430 (e.g., cached at query processor 430), which are returned 432 and used to perform the read. If a catalog version is not valid, a catalog error may be returned instead of data pages, as indicated at 432. For writes, write requests may be sent to an adjudicator 440 with an assumed catalog version, which validates a catalog version and determine whether a conflict exists and if not, writes 434 to journal 450 and acknowledges the write 435 to query processor 430 or returns a catalog error. Responses 416 may then be sent to front-end 320 for response 417 to client application(s) 410.

In the event of catalog errors (or upon restart/startup), query processor 430 may send a request to get a catalog version 436 from storage service 220 which may return the catalog version 437 for subsequent use. In at least one embodiment, a request to get 436 and return a catalog 437 may be sent in order to start up a query processor 430 that has failed or been restarted.

As discussed above with regard to FIGS. 1A-1B, a database may be replicated and/or partitioned. In some scenarios this replication may be across regions. FIG. 5 is a block diagram illustrating cross region replication for a database hosted in a database service that implements asynchronous catalog updates for accessing database partitions, according to some embodiments. In this illustrated example, multiple query processors 532a and 532b of one or more database instances may be hosted in respective services in database services 509a and 509b in region 505a and region(s) 505b to provides database services to clients that access the databases in the different regions. It should be noted that, while the illustrated example shows two regions, any number of regions may be implemented. As discussed above with regard to FIG. 4, query processors may provide read and write capabilities to the database, utilizing query processor 532a and adjudicator 534a, in different regions, and provide capabilities to update a schema of a database through a catalog update.

In some embodiments, adjudicators 534 may implement protocols to support cross-region transactions. For example, adjudicator 534a may communicate with adjudicator 534b to broadcast or share catalog version updates or other write and/or query processors 532a and 532b in order to determine whether a given write conflicts (e.g., a write to update a schema) or can be committed. Once committed, these changes may be written to journals 534a or 534b which may ultimately have the changes applied by respective crossbars 550a and 550b to respective copies of the database volume 540a and 540b in each region 505a and 505b.

Figure 5:
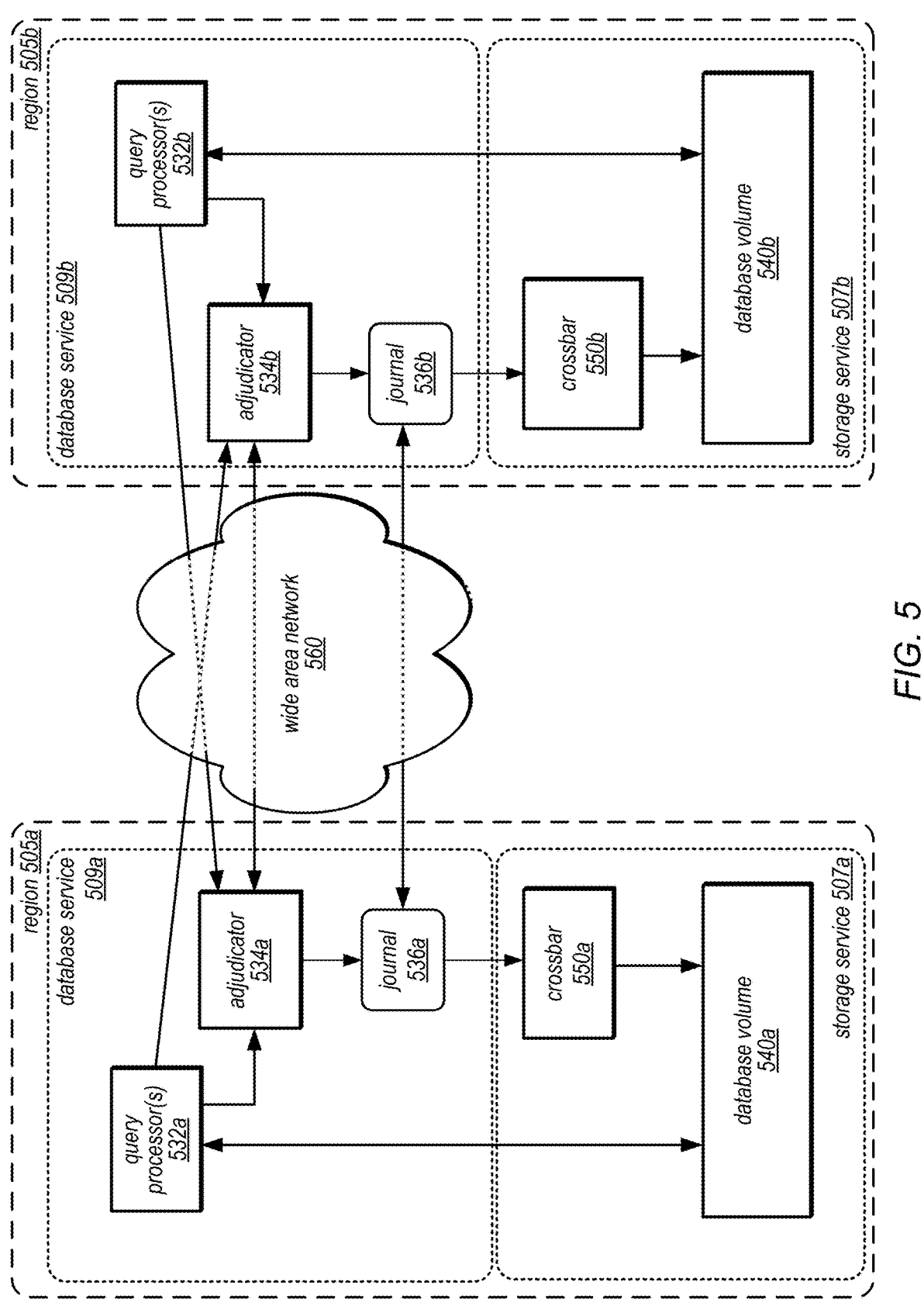
FIG. 5 is a block diagram illustrating cross region replication for a database hosted in a database service that implements asynchronous catalog updates for accessing database partitions, according to some embodiments.

As illustrated in FIG. 5, various communications can occur across wide area network 560 between different components (e.g., query processors 532a and 532b, adjudicators 534a and 534b, and journals 536a and 536b). Replication messages that describe updates to a database may be sent amongst these components according to various types of synchronized replication techniques that may be implemented. Therefore, the techniques discussed above with regard to FIG. 1A-1B (e.g., writes to update metadata) may be applied to various ones of the possible replication messages exchanged, either across wide area network 560 or internally within a region 505a and 505b. For example, replication messages may include updates that are shared as part of performing writes to update a schema. These writes may be detected and used to initiate asynchronous task processing workflows.

Figure 6A:
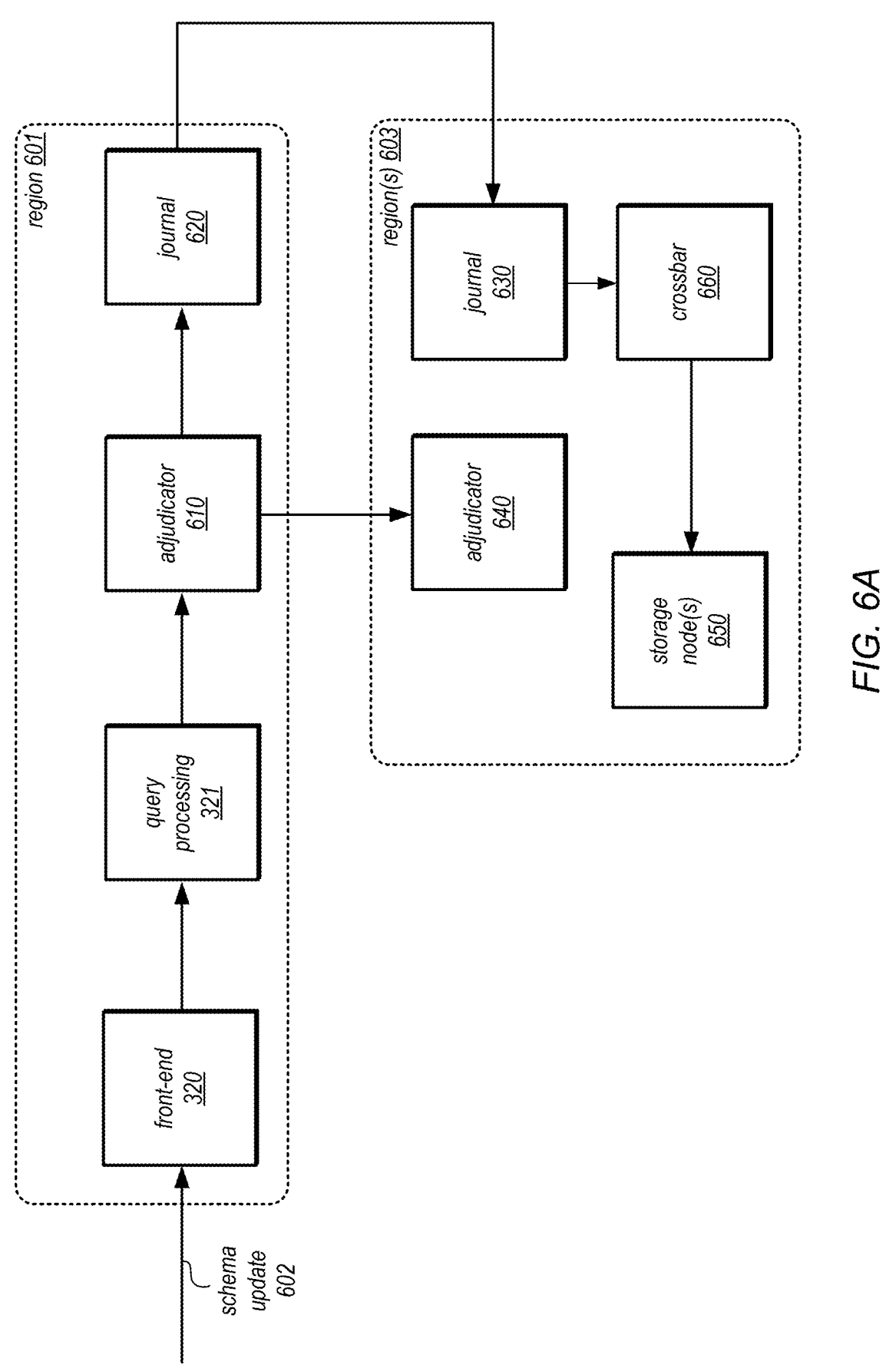
FIG. 6A is a block diagram illustrating interactions to broadcast catalog updates, according to some embodiments.

FIG. 6A is a block diagram illustrating interactions to broadcast catalog updates, according to some embodiments. A request that updates a schema 602 may be received at front-end 320. For example, the request may include DDL requests to add, remove, or otherwise modify column(s) of a table. Front-end 320 may dispatch the request to a query processor 321 in region 601 that performs the various steps to update the catalog according to the schema update via adjudicator, 610 and journal 620. For example, a primary or complete copy of a catalog may be maintained in region 601 (with partial or temporarily cached copies maintained in other region(s), like region(s) 603. In at least one embodiment, journal to journal replication techniques (as noted above with regard to FIG. 5), may be used to share the schema update between journal 620 in region 601 and journal 630 in other region(s) 603. As discussed above, crossbar 660 may obtain the schema update and apply it to storage node(s) 650. In this way storage node(s) 650 may accept or reject read requests based on schema version according to the techniques discussed above.

In some embodiments, adjudicator 610 may share with other adjudicators in other regions 603 (as well as adjudicators in region 601) the schema update, in order to allow those adjudicators to apply it to access requests. As discussed above, adjudicators may be implemented to independently verify that a change, in this case an update a schema, is valid for the database. Exchanging or sharing a schema update between adjudicators, will allow each adjudicator, like adjudicator 640, to reach the same determination that the update the schema is valid and should be committed to the database. Such techniques may also allow, as noted above with regard to FIG. 3, each adjudicator to verify a version of a catalog (e.g., metadata of a catalog) that stores the schema is the correct version used to perform other writes to the database.

For example, a schema update may be performed or submitted to adjudicators as a transaction, that include one or more multiple operations that succeed or fail together, when a request to commit the transaction is submitted. An adjudicator may reject a commit of transaction of a schema update if any of the version numbers in the assumed_versions field of a schema update has been modified since a transaction start time (assigned to a schema update as the schema update may be performed as several operations that are committed together in a single transaction on a database), or if the any of the version numbers do not match the latest version seen at an adjudicator. The commit may also be rejected if multiple requests to set new catalog versions arrive concurrently. When rejecting a call, an Adjudicator will respond with list of latest versions. This enables a query processor to patch its catalog with a call to storage node using the schema version from adjudicator to ensure it is querying storage with the right parameters.

FIG. 6B is an example of state transitions for catalog updates that change a schema, according to some embodiments. Table 690 illustrates an example of schema state changes. As an example, starting at time T0, an active schema of a table may be applied, $A_0$. At time T 5, a request to update the schema may be received to version $B_5$. This version may be not visible to a reader during a building state, but may be visible to a reader when promoted or otherwise made final, as indicated at time T 7. As for a writer, both versions may be used to perform writes, ensuring that a write is compatible with both versions, as indicated at times T 5 and T 6, until time T 7, after which $B_5$ is used.

The database service and storage service discussed in FIGS. 2 through 6B, provide examples of a system that may implement asynchronous data set updates for accessing database partitions. However, various other types of distributed database systems (as discussed above with regard to FIG. 1) may implement these techniques. FIG. is a high-level flowchart illustrating various methods and techniques to implement asynchronous data set updates for accessing database partitions, according to some embodiments. Various different systems and devices of a distributed database system may implement the various methods and techniques described below, either singly or working together. For example, a control plane component of a distributed database system and/or a database instance may implement the various methods. Alternatively, a combination of different systems and devices may implement these techniques. Therefore, the above examples and or any other systems or devices referenced as performing the illustrated method, are not intended to be limiting as to other different components, modules, systems, or configurations of systems and devices.

As indicated at 710, an update may be received at a distributed database system, to a data set stored in respective copies along with different partitions of a database, in at least one embodiment. In at least one embodiment, an update may be DDL request to change a schema of a database table, causing an update to a catalog that stores the schema. In at least one embodiment, the update may be a DML request (e.g., to add, update, remove/delete) data from a table, such as a small table that is frequently accessed across different partitions in order to perform other access requests (e.g., to join with other tables).

As indicated at 720, the update may be performed to the data set, including by writing a new version identifier of the data set with a corresponding log record that includes the update to the data set at respective update logs of the different partitions of the database, in at least one embodiment. For example, a new version identifier may be a next version identifier in a monotonically increasing sequence of numbers (e.g., 1, 2, 3, 4, 5, 6, 7, 8, 9, . . . ). In at least one embodiment, a new version identifier may be a timestamp. In at least one embodiment, updating the write update logs may include sending a write directly to update logs at a storage system that applies a commitment technique (in addition to host data for performing read requests). In at least one embodiment, updating the write update logs may include sending a write to a commitment management component, such as an adjudicator as discussed above with regard to FIGS. 2-6A. In at least one embodiment, the update may be rejected if another update for the data set has been performed (and the update does not include an assumed version of the data set). In at least one embodiment, the update may be rejected if another update for the data set is being performed (e.g., a schema change is already ongoing, but not yet active (as shown above in FIG. 6B).

As indicated at 730, the distributed database system may use the new version identifier as input to a validation operation for different operations that access the data set as part of accessing individual ones of different partitions of the database, in at least one embodiment. A validation operation may be used to compare an assumed version of the data set (e.g., by a query processor or other component that performs an access request) with the new version identifier (as a current version identifier of the data set). If the validation operation is performed, as indicated at 740, the access request may be performed if valid, as indicated at 750, and not performed if not valid, as indicated at 760. If rejected, further attempts to perform an access request may be made after obtaining a current version of the data set (e.g., by storing it in a cache).

Figure 8:
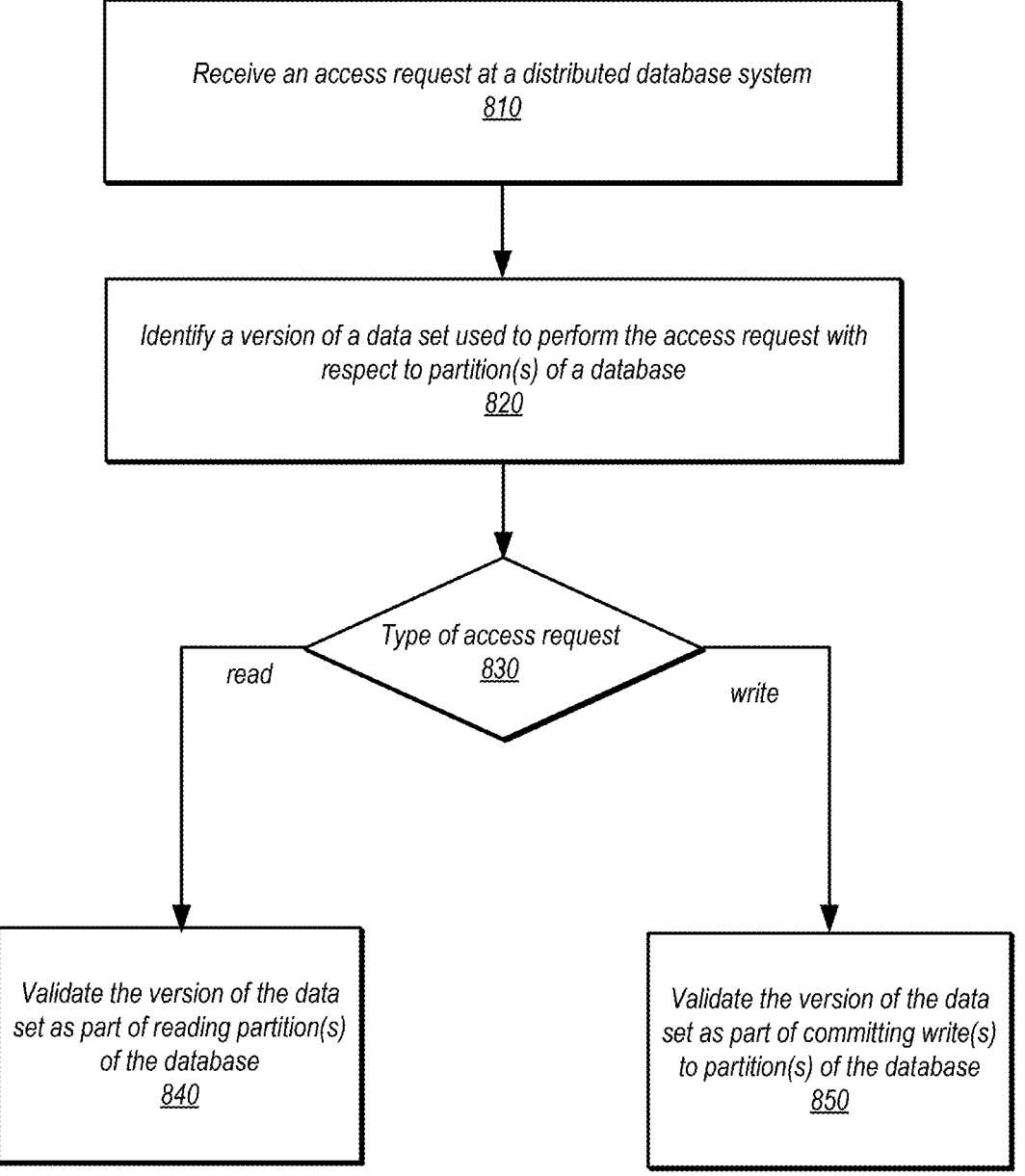
FIG. 8 is a high-level flowchart illustrating various methods and techniques to implement performing access requests using asynchronous updated data sets, according to some embodiments.

FIG. 8 is a high-level flowchart illustrating various methods and techniques to implement performing access requests using asynchronous updated data sets, according to some embodiments. As indicated at 810, an access request may be received at a distributed database system, in at least one embodiment. In at least one embodiment, an access request may be query statement, API call, instruction, command, or various other request that specifies operations to read and/or write data from a distributed database (e.g., from one or more tables). As discussed above, a request processor, query engine, or other front-end of a distributed database system may receive and parse the access request to determine a plan or other set of operation(s) to perform the access request.

As indicated at 820, a version of a data set used to perform the access request with respect to one or more partition(s) of a database may be identified, in at least one embodiment. For example, the data set may be a catalog that describes a schema and/or other metadata used to access/determine which partition(s) or portions of data access and/or how to access the partition(s) or portion(s) (e.g., what number and data types of columns are expected to be in a table). In another example, the data set may be a smaller table that is frequently accessed and used to join multiple large that are stored in partitions tables (e.g., a reverse star schema of database tables). A version of the data set may be a timestamp or other monotonically increasing number, in at least one embodiment.

Different types of access request may be handled in different ways, as indicated at 830. For example, for read requests, the version of the data set may be validated as part of reading one or more portions of the database, as indicated at 840. For example, one (or more) storage nodes may use a local copy of the data set or may just verify that a copy of the data set maintained at a request processor is valid. As discussed above with regard to FIG. 7, a validity operation may compare a recorded/stored version of the data set at storage with an assumed version provided by a request processor, so that if the versions do not match, the version of the data set may not be validated. If not validated, then the read request may be rejected. In at least one embodiment, a rejection may include a current version of the data set, which may allow a request processor to obtain the current version of the data set (e.g., from storage).

In at least one embodiment, if the request is a write request, then as indicated at 850, the version of the data set may be validated as part of committing write(s) to partition(s) of the database. For example, in at least one embodiment, commitment of write(s) may occur at storage nodes (or part of a storage system, such as a lead storage node for a partition). In at least one embodiment, commitment of write(s) may occur at a separate commitment management component that ensures atomicity, consistency, and/or isolation for a distributed database system, such as adjudicators as discussed above with regard to FIGS. 2-6A. As discussed above with regard to FIG. 7, a validity operation may compare a recorded/stored version of the data set at storage (or at a separate commitment management component, such as an adjudicator) with an assumed version provided by a request processor, so that if the versions do not match, the version of the data set may not be validated. If not validated, then the write request may be rejected. In at least one embodiment, a rejection may include a current version of the data set, which may allow a request processor to obtain the current version of the data set (e.g., from storage).

The methods described herein may in various embodiments be implemented by any combination of hardware and software. For example, in one embodiment, the methods may be implemented on or across one or more computer systems (e.g., a computer system as in FIG. 9) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
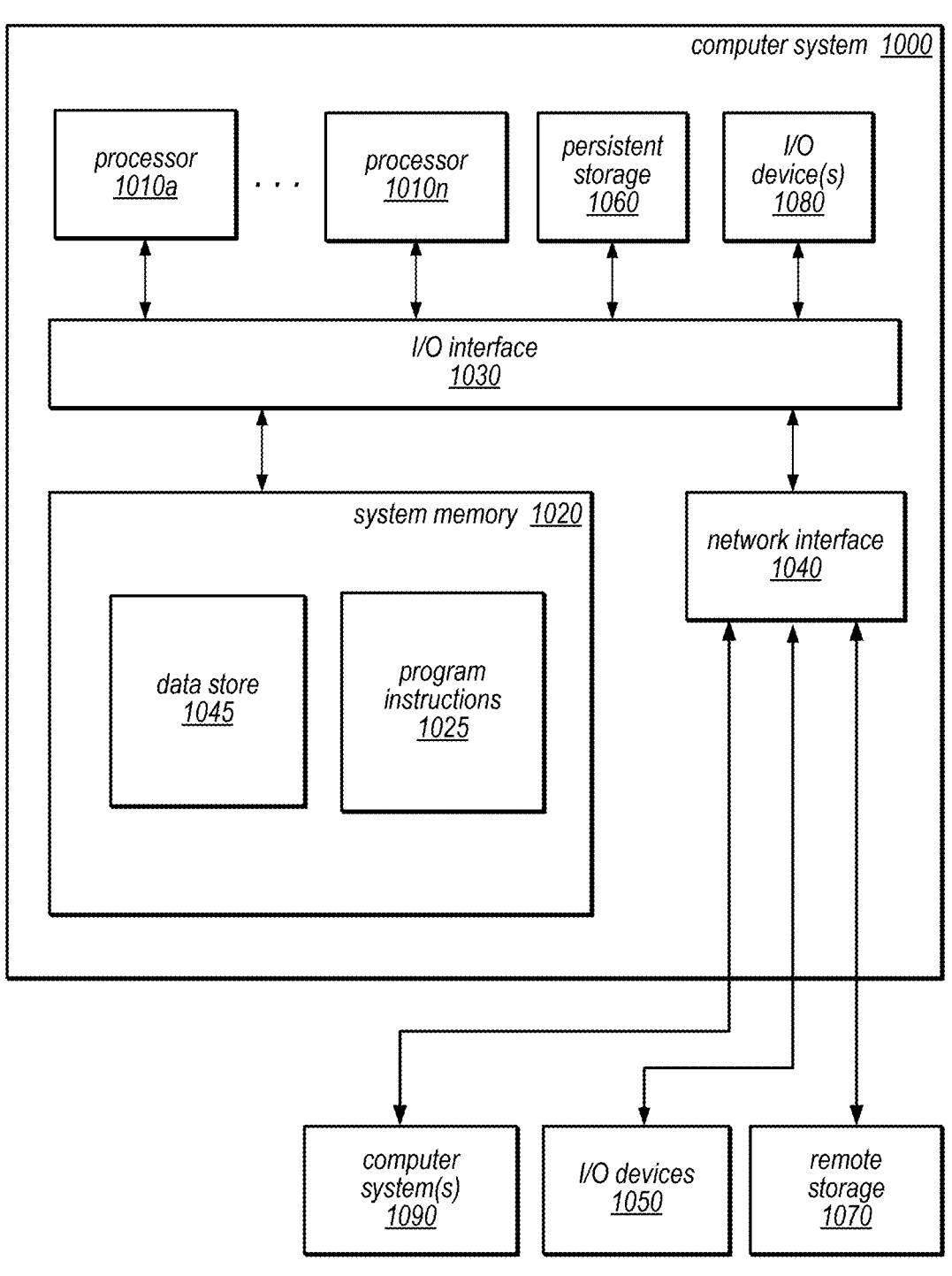
FIG. 9 is a block diagram illustrating an example computer system, according to various embodiments.

FIG. 9 is a block diagram illustrating an example computer system, according to various embodiments. For example, computer system 1000 may implement asynchronous data set updates for accessing database partitions, in various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that may store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, primary nodes, read-only node nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("REST-ful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:

a plurality of computing devices, respectively comprising at least one processor and a memory, that implement a distributed database system, wherein the distributed database system is configured to:

receive a request to modify a schema of a database table, wherein the database table is stored in different partitions across the plurality of computing devices;

update respective copies of metadata of a catalog, wherein the catalog stores the schema of the database table, wherein the respective copies of the metadata of the catalog are co-located with individual ones of the different partitions, wherein to update the respective copies of the metadata of the catalog, the distributed database system writes a new version identifier of the metadata of the catalog with a corresponding log record that includes the modification to the catalog at respective update logs of the different partitions of the database table; and use the new version identifier as input to a validation operation for different operations that use the metadata of the catalog as part of accessing individual ones of different partitions of the database table, wherein access requests to the database table are rejected that are determined to be invalid by the validation operation, wherein one of the access requests is a request to write data in at least one of the partitions, wherein the one access request succeeds according to a determination that an assumed version of the data set is valid with respect to the new version of the data set as part of the validation operation.

2. The system of claim 1, wherein the distributed database system uses a commitment component, separate from a storage system that stores the respective copies of the metadata of the catalog and the different partitions of the database table, to commit the update to the schema using the respective copies of the update log.

3. The system of claim 1, wherein the distributed database system comprises a plurality of query processors that cache the metadata of the catalog to perform different ones of the different access requests.

4. The system of claim 1, wherein the distributed database system is a database service implemented across a plurality of regions of a provider network.

5. A method, comprising:

receiving, at a distributed database system, an update to a data set stored in respective copies along with different partitions of a database;

performing, by the distributed database system, the update to the data set, comprising writing a new version identifier of the data set with a corresponding log record that includes the update to the data set at respective update logs of the different partitions of the database; and using, by the distributed database system, the new version identifier as input to a validation operation for different operations that access the data set as part of accessing individual ones of different partitions of the database, wherein access requests to the database are rejected that are determined to be invalid by the validation operation, wherein one of the access requests is a request to write data in at least one of the partitions, wherein the one access request succeeds according to a determination that an assumed version of the data set is valid with respect to the new version of the data set as part of the validation operation.

6. The method of claim 5, wherein the distributed database system uses a commitment component, separate from a storage system that stores the respective copies of the data set and the different partitions of the database, to commit the update to the data set using the respective copies of the update log.

7. The method of claim 5, wherein a different one of the access requests is a request to read data in at least one of the partitions, wherein the one access request succeeds according to a determination that an assumed version of the data set is valid with respect to the new version of the data set as part of the validation operation.

8. The method of claim 5, wherein a different one of the access requests is a request to write data in at least one of the partitions, wherein the one access request is rejected according to a determination that an assumed version of the data set is not valid with respect to the new version of the data set as part of the validation operation.

9. The method of claim 5, wherein access requests to the database that are rejected include an indication of the new version of the data set as part of an error response.

10. The method of claim 5, further comprising:

receiving a further update to the data set; and rejecting the further update to the data set responsive to a determination that the update is to the data set is not complete.

11. The method of claim 5, wherein the update to the data set is an update to a schema, wherein the data set is metadata of a catalog cached at a plurality of different query processors that independently perform different ones of the access requests to the database.

12. The method of claim 5, wherein the partitions of the database are partitions of one or more relational database tables.

13. One or more non-transitory, computer-readable storage media, storing program instructions that when executed on or across one or more computing devices cause the one or more computing devices to implement:

receiving, at a distributed database system, an update to a data set stored in respective copies along with different partitions of a database;

performing, by the distributed database system, the update to the data set, comprising writing a new version identifier of the data set with a corresponding log record that includes the update to the data set at respective update logs of the different partitions of the database; and using, by the distributed database system, the new version identifier as input to a validation operation for different operations that access the data set as part of accessing individual ones of different partitions of the database, wherein access requests to the database are rejected that are determined to be invalid by the validation operation, wherein one of the access requests is a request to write data in at least one of the partitions, wherein the one access request succeeds according to a determination that an assumed version of the data set is valid with respect to the new version of the data set as part of the validation operation.

14. The one or more non-transitory, computer-readable storage media of claim 13, wherein the distributed database system uses a commitment component, separate from a storage system that stores the respective copies of the data set and the different partitions of the database, to commit the update to the data set using the respective copies of the update log.

15. The one or more non-transitory, computer-readable storage media of claim 13, wherein a different one of the access requests is a request to read data in at least one of the partitions, wherein the different one of the access requests succeeds according to a determination that an assumed version of the data set is valid with respect to the new version of the data set as part of the validation operation.

16. The one or more non-transitory, computer-readable storage media of claim 13, storing further program instructions that when executed on or across the one or more computing devices, cause the one or more computing devices to further implement:

receiving a further update to the data set; and rejecting the further update to the data set responsive to a determination that the update is to the data set is not complete.

17. The one or more non-transitory, computer-readable storage media of claim 13, wherein the update to the data set is an update to a schema, wherein the data set is catalog metadata cached at a plurality of different query processors that independently perform different ones of the access requests to the database.

18. The one or more non-transitory, computer-readable storage media of claim 13, wherein the distributed database system is a database service implemented across a plurality of regions of a provider network.

\* \* \* \* \*